(12) United States Patent
Toppani (10) Patent No.: US 11,597,260 B2
(45) Date of Patent: Mar. 7, 2023

(54) AIR TREATMENT SYSTEM FOR A CONFINED ENVIRONMENT

(71) Applicant: Tecnocad Engineering & Design S.r.l., Turin (IT)

(72) Inventor: Nicolas Toppani, Turin (IT)

(73) Assignee: Tecnocad Engineering & Design S.r.l., Turin (IT)

( * ) Notice: Subject to any disclaimer, the term of this patent is extended or adjusted under 35 U.S.C. 154(b) by 185 days.

(21) Appl. No.: 16/958,237

(22) PCT Filed: Dec. 21, 2018

(86) PCT No.: PCT/IB2018/060524
§ 371 (c)(1),
(2) Date: Jun. 26, 2020

(87) PCT Pub. No.: WO2019/130196
PCT Pub. Date: Jul. 4, 2019

(65) Prior Publication Data
US 2021/0070149 A1    Mar. 11, 2021

(30) Foreign Application Priority Data
Dec. 28, 2017   (IT) .................... 102017000150560

(51) Int. Cl.
*B60H 3/06*    (2006.01)
(52) U.S. Cl.
CPC .................. *B60H 3/0658* (2013.01)
(58) Field of Classification Search
CPC ........ B60H 3/0658; B60H 2001/00085; B60H 1/00414; B60H 3/0633; B60H 3/0641; B60H 1/00378
USPC .......................................... 454/158
See application file for complete search history.

(56) References Cited

U.S. PATENT DOCUMENTS

| 2016/0367928 | A1* | 12/2016 | Leconte | B01D 46/444 |
| 2017/0182863 | A1* | 6/2017 | Davter | B60H 3/0641 |
| 2021/0086582 | A1* | 3/2021 | Haf | B60H 1/00378 |

FOREIGN PATENT DOCUMENTS

| EP | 3109077 A1 | 12/2016 |
| EP | 3173266 A1 | 5/2017 |
| WO | 2016147135 A1 | 9/2016 |

OTHER PUBLICATIONS

International Search Report & Written Opinion dated Apr. 15, 2019. 12 pages.

* cited by examiner

*Primary Examiner* — Steven B McAllister
*Assistant Examiner* — Charles R Brawner
(74) *Attorney, Agent, or Firm* — RMCK Law Group PLC (57) ABSTRACT

An air-treatment system for a confined environment, in particular the cabin of a vehicle, includes: a supply unit including an inlet port, a delivery port, and a purge port, the supply unit being configured for delivering air to said confined environment through the delivery port; and a first filtering device having a first filtration level, and a second filtering device having a second filtration level, each of the first and second filtering devices being arranged in fluid communication with the inlet port of said supply unit at a circuit node. A single flow-control valve determines inlet flow through one or other of the filtering devices.

11 Claims, 5 Drawing Sheets

AIR TREATMENT SYSTEM FOR A CONFINED ENVIRONMENT

CROSS-REFERENCE TO RELATED APPLICATIONS

This application is a 371 National Stage of International Application No. PCT/IB2018/060524, filed Dec. 21, 2018, which claims priority to Italian Patent Application No. 102017000150560 filed Dec. 28, 2017. The disclosure of each of the above applications is incorporated herein by reference in its entirety.

FIELD OF THE INVENTION

The present invention relates to systems for treating air for confined environments, in particular vehicle cabins. The invention has been developed with particular reference to air-treatment systems that equip vehicles operating in hostile environments (i.e., environments that are polluted, contaminated, or contain noxious dust).

PRIOR ART

Known air-treatment systems for confined environments, such as cabins of vehicles operating in hostile environments, generally include a supply unit, which is configured for administering air to the confined environment, and a pair of filtering devices with different performance features. Normally, a first filtering device ensures a first filtration level (typically, this is a filtering device with filter element that conforms to EU Category 4 of EN 15695 standard), whilst a second filtering device ensures a second filtration level, lower than the first (typically, this is a filtering device with filter element that conforms to Category 2 of EN 15695 standard).

In a first operating condition, which is generally activated during use in a markedly hostile environment, the supply unit takes in air through the first filtering device and introduces it into the cabin. From the cabin the air is evacuated through the second filtering device. In a second operating condition, which is generally activated during use in a non-hostile environment (or in any case an environment with low hostility), the supply unit takes in air through the second filtering device and introduces it into the cabin. From the cabin the air is evacuated through the first filtering device, thus carrying out purge thereof.

Selection of one or other of the positions is provided by means of a plurality of flow-control valves, in particular at least one valve associated to each filtering device. Known solutions of this type may be found, for example, in WO 2016/005401 A1, WO 2016/005406 A1, and WO 2015/159248 A1.

This, however, involves two sorts of technical problems; namely:
- an unnecessary complication of construction, moreover accompanied by an inevitable increase in the production cost; and
- a non-negligible encumbrance, which a decidedly undesirable factor in the light of the stringent requisites of installation proper to these systems (generally in the roof of the vehicle cabin).

OBJECT OF THE INVENTION

The object of the present invention is to overcome the technical problems mentioned above. In particular, the object of the invention is to provide an air-treatment system for confined environments, in particular cabins of vehicles operating in hostile environments, characterized by a simplified construction and lower production costs, albeit ensuring performance levels equal to or higher than those of known systems, and characterised by reduced overall dimensions (or, equivalently, that, given the same overall dimensions available, enable housing of filtering devices of larger size).

SUMMARY OF THE INVENTION

The object of the present invention is achieved by an air-treatment system having the features of the annexed claims, which form an integral part of the technical disclosure provided herein in relation to the invention. In particular, the object of the invention is achieved by an air-treatment system for a confined environment, in particular the cabin of a vehicle, comprising:
- a supply unit including an inlet port, a delivery port, and a purge port, said supply unit being configured for delivering air to said confined environment through said delivery port;
- a first filtering device having a first filtration level, and a second filtering device having a second filtration level, each of said first and second filtering devices being arranged in fluid communication with the inlet port of said supply unit at a circuit node; and
- a flow-control valve arranged at said circuit node and including a first working port in fluid communication with said first filtering device, a second working port in fluid communication with said second filtering device, a third working port in fluid communication with said inlet port, and a fourth working port in fluid communication with said purge port, the flow-control valve further including:
- a first operating position, wherein a fluid communication is established between the first working port and the third working port, and a fluid communication is established between the second working port and the fourth working port; and
- a second operating position, in which a fluid communication is established between the second working port and the third working port, and a fluid communication is established between the first working port and the fourth working port.

BRIEF DESCRIPTION OF THE DRAWINGS

The invention will now be described with reference to the annexed drawings, which are provided purely by way of non-limiting example and in which.

DETAILED DESCRIPTION OF PREFERRED EMBODIMENTS

Figure 1:
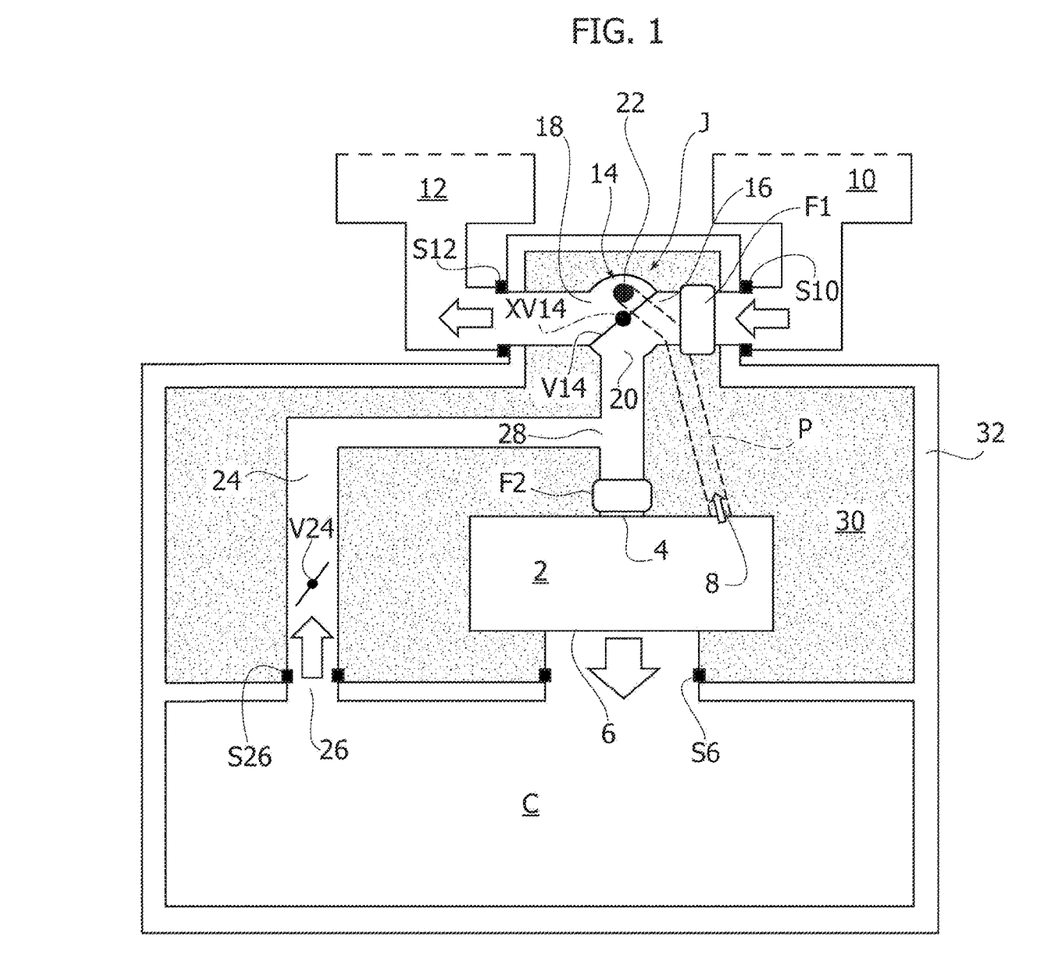
FIG. 1 is a schematic representation of an air-treatment system according to the invention in a first operating condition.
Figure 2:
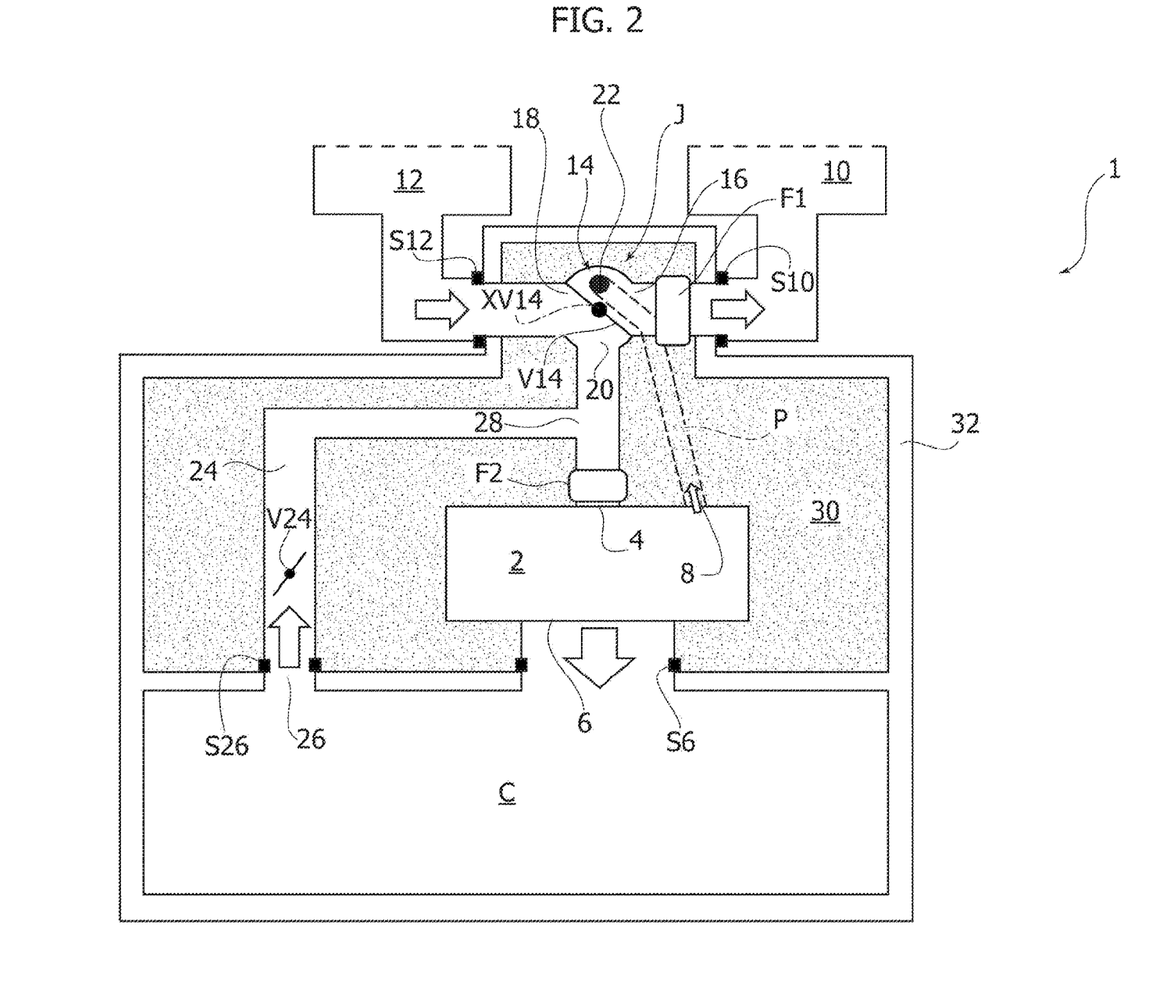
FIG. 2 is a schematic representation of an air-treatment system according to the invention in a second operating condition.

The reference number 1 in FIGS. 1 and 2 designates as a whole an air-treatment system for a confined environment, in particular the cabin of a vehicle, according to various embodiments of the invention. The system 1 comprises a supply unit 2 including an inlet port 4 and a delivery port 6. The supply unit 2 is configured to intake a flow of air through the port 4 and deliver air through the delivery port 6 to a confined environment C, for example the cabin of a vehicle. In a preferred embodiment for vehicle use, the supply unit 2 is a cabin HVAC (Heating, Ventilation, and Air Conditioning) unit, including a fan as element for intake and delivery of a flow of air through the ports 4 and 6. Preferentially, the supply unit includes—when it is provided as cabin HVAC unit—an evaporator and a heater for the cabin. The fan may be set either inside the unit 2 or on the outside as in the case of the fan F2 in the figures, which is set immediately upstream of the inlet port 4.

It should be borne in mind, however, that for the purposes of the present invention the supply unit 2 may be limited to comprising just a device for generating an air flow (i.e., a fan or a blower), without necessarily incorporating the elements proper to an HVAC system.

The supply unit 2, however this may be made (whether a simple flow generator or an HVAC unit), moreover includes a purge port 8, which functionally operates as output port.

The system 1 further comprises a first filtering device 10 having a first filtration level, and a second filtering device 12 having a second filtration level, lower than the first filtration level. Preferentially, the first filtering device complies with the filtering requirements according to EU Category 4—EN 15695 standard (CAT 4), and the second filtering device complies with the filtering requirements according to EU Category 2—EN 15695 (CAT 2). The first and second filtering devices 10, 12 are both set in fluid communication with the inlet port 4 of the supply unit 2 at a circuit node J. As may be seen in the figure, the air flow paths starting from each of the filtering devices 10, 12 merge at the confluence into node J, wherein, in turn, the path of fluid associated to the inlet port 4 converges. Basically, a T junction or Y junction is provided at the node J, where the flow is governed by means of a flow-control valve 14. It should be noted that, for this purpose, the filtering devices comprise a casing housed in which is a filter element, which at the same time provides a flow duct, by means of which the air that traverses the filter element is conveyed towards other environments (here, in particular towards the node J and the valve 14).

The flow-control valve 14 is set at the circuit node J and includes a first working port 16 in fluid communication with the first filtering device 10, a second working port 18 in fluid communication with the second filtering device 12, a third working port 20 in fluid communication with the inlet port 4, and a fourth working port 22 in fluid communication with the purge port 8 by means of a purge duct P. Preferentially, fluid communication is established by means of a connection between the working ports 16, 18, 20, 22 and the respective aforementioned environments. For instance, fluid communication between the port 16 and the filtering device 10, and between the port 18 and the filtering device 12, may be provided in the form of connection by means of a duct, which, in the case of the filtering devices 10, 12, may be provided as an appendage or prolongation of the casing of the filtering device itself. Also in the case of the port 20, fluid communication with the inlet port 4 may be provided in the form of connection by means of a duct. In the case of the port 22, for which provision of a purge duct has already been envisaged, other solutions are in particular possible, as will be described hereinafter.

A flowmeter F1 is set at the interface between the first filtering device 10 and the port 16. The position of the flowmeter F1 is chosen in the light of the features of the filtering device 10: on account of its high filtering efficiency, it is necessary to control in a more accurate way, as compared to the filtering device 12, the rate of the flow that traverses it (in particular, ensuring that it will not exceed limit values beyond which the performance decays). The filtering device 12, on account of its lower performance in terms of filtering efficiency, does not require an accurate control of the flow rate.

The flow-control valve 14 moreover includes two operating positions, which determine two different operating regimes of the system 1. In particular, the valve 14 includes a first operating position, in which a fluid communication is established between the first working port 16 and the third working port 20, and a fluid communication is established between the second working port 18 and the fourth working port 22. The position may be seen in FIG. 1, where it is defined by a moving element consisting of a butterfly valve (or a flap valve) V14 that turns about an axis XV14.

The valve 14 moreover includes a second operating position, in which a fluid communication is established between the second working port 18 and the third working port 20, and a fluid communication is established between the first working port 16 and the fourth working port 22. The position may be seen in FIG. 2 and is again obtained by means of the butterfly valve (or flap valve) V14, simply rotated to define the connection layout between ports described above.

Figure 3:
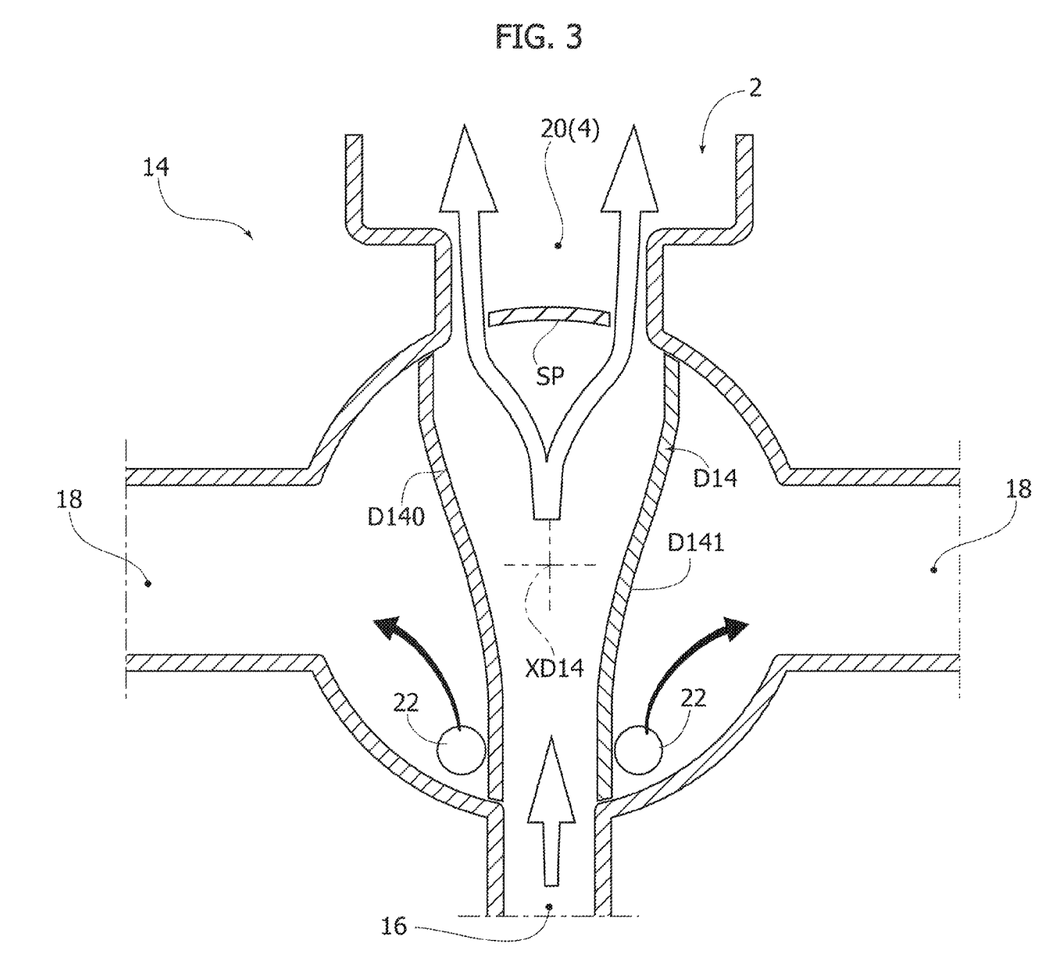
FIGS. 3 and 4 illustrate two different operating positions of an element of the system of FIGS. 1 and 2 according to an embodiment of the invention.
Figure 4:
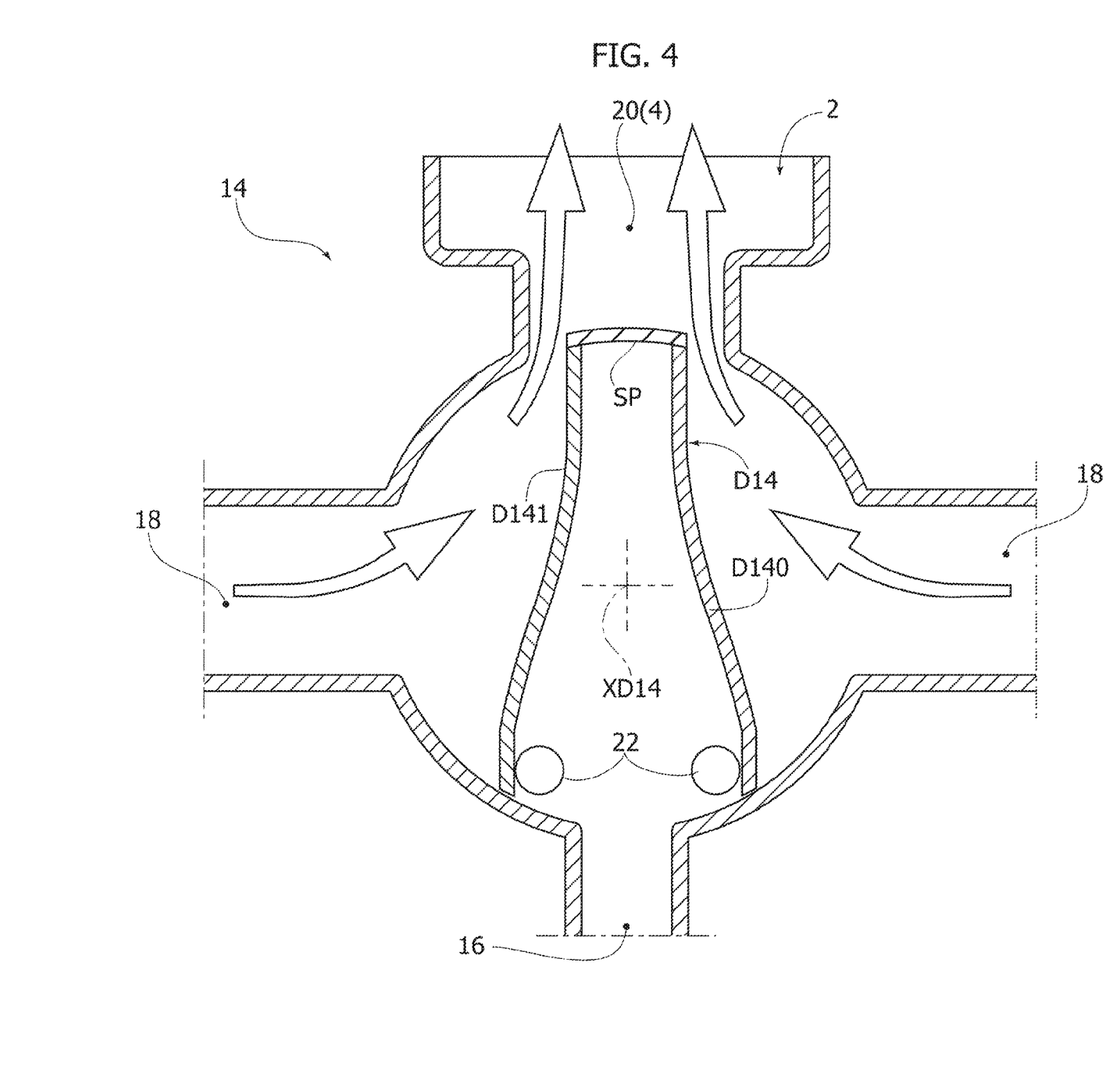

It should, however, be noted that, in alternative embodiments of the system 1, the valve 14 may be provided as shown in FIGS. 3 and 4. Unlike what may be seen in FIG. 1 or in FIG. 2, the mobile element of the valve 14 is provided by means of a drum D14 rotatable around an axis XD14 (equivalent to the axis XV14). The drum D14 is rotatable within a valve body that has—in four polar positions in opposed pairs—the first working port 16, the second working port 18 in dual/twin configuration (the twin port 18 occupies two opposite polar positions on the valve body), the working port 20 at the polar end opposite to the port (in this case, the reference number of the port 20 is associated to the number 4 in brackets to indicate the connection to the contiguous supply unit 2), and the fourth working port 22, which is also in dual/twin configuration, and in particular is provided as a pair of openings arranged on opposite sides of the port 16.

The drum D14 includes a first mobile septum D140 and a second mobile septum D141, which are symmetrical with respect to an axis contained in the plane of the drawing, intersecting the axis XD14 and aligned along the 12 o'clock to 6 o'clock direction on the quadrant of the valve body, as represented in FIG. 3 (or FIG. 4). The mobile septa D140, D141 are shaped so as to define between them a flow channel with variable section (converging or diverging as a function of the direction of flow) and co-operate with the walls of the valve body and with a fixed septum SP set at the port in order to delimit the volumes of communication between the working ports of the valve 14.

In the position illustrated in FIG. 14, which corresponds to the first operating position of the valve 14, the septa D140, D141 isolate the ports 18 and from the ports 16 and 20. In particular, the flow channel between the two septa D140, D141 connects the port 16 to the port 20, while the (two) volumes comprised between the outside of the flow channel and the walls of the valve body each establish a communication between a pair of twin ports 18, 22. It should be noted that the flow channel defined by the septa D140, D141 converges towards the port 16 so as to leave the ports 22 exposed for connection to the ports 18, whereas it diverges towards the port 20 in such a way as to open a passageway at the sides of the septum SP.

In the position illustrated in FIG. 4, which corresponds to the second operating position of the valve 14, and moreover corresponds to a rotation through 180° of the drum D14 starting from the position of FIG. 3, the septa D140, D141 isolate the ports 16 and 22 from the ports 18 and 20. The flow channel defined between the two septa D140, D141 is rendered blind at the port 20 by means of the septum SP: in this regard, the minimum distance between the edges of the septa D140, D141 in the convergent section will have to be chosen in such a way that they are covered by the septum SP, thus guaranteeing obstruction of the channel.

At the opposite end, the (maximum) distance between the edges of the septa D140, D141 will have to be chosen so as to contain the twin ports 22 between them preventing obstruction thereof and thus setting up the communication between the ports 22 and the port 16. The (two) volumes comprised between the outside of the flow channel and the walls of the valve body on opposite sides of the septum SP each establish a communication between the ports 18 and the port 20 (the flows join up again downstream of the septum SP).

To proceed with the description, the system 1 comprises a recirculation duct 24, which sets the confined environment C in fluid communication with the inlet port 4; i.e., it is configured for redirecting part of the air within the environment C towards the inlet of the supply unit 2. The flow of recirculated air is drawn off through a recirculation port 26 and can be controlled by means of a flap valve V24, which moreover ensures the possibility of pressurising the environment C (according to the degree of partialisation of the leaf valve V24). Re-introduction of the recirculated air into the inlet of the unit 2 is carried out upstream of the fan F2, if this is external, or else in general upstream of the port 4.

As may be seen in FIGS. 1 and 2, preferentially the supply unit 2, the recirculation duct 24, and the valve 14 are immersed in an isolated and air-tight volume 30.

The volume 30 is delimited by a casing 32 in which a pressure is maintained higher than atmospheric pressure. For this purpose, the supply unit 2 may be used, sending air to the volume 30 by means of a branching of the purge duct P, or a separate distribution system, or the pre-arrangement of openings along the purge duct 8 for delivery of pressurised air into the volume 30. In the case where the aforesaid components are immersed in the volume 30, seals S10, S12 are provided at the interface between the casing 32 and the filtering devices 10, 12, respectively, and seals S6, S26 at the delivery port 6 and the recirculation port 26, respectively.

It should, on the other hand, be noted that—unlike the other connections, where preferentially the fluid communication is established by means of a connection element proper (a duct, a tube, or a connector according to the needs)—in the case where the volume 30 is provided, fluid communication between the ports 8 and 22 may be obtained even without a connection element. In particular, in an alternative embodiment, the purge port 8 may simply give out into the volume 30, as likewise the port 22. Sending of a flow of air into the volume 30 through the port 8 for pressurisation thereof results simply in delivery of a part of the aforesaid flow of air to the port 22, through which the flow invades the valve 14 and is then routed to the destination dictated by the operating position of the valve itself.

Operation of the system 1 is described in what follows. The system 1 is configured for equipping vehicles operating in hostile environments (environments that are polluted or contaminated or where noxious dust is present), and for administering filtered air to a corresponding confined environment within the cabin C of the vehicle.

Inlet of the air from the external environment may occur through the filtering device 10 or through the filtering device 12, according to the circumstances. In the case of operation in a very hostile environment, inlet occurs through the filtering device 10 on account of its higher filtering performance as compared to the device 12. The valve 14 is kept in the first operating position that may be seen in FIG. 1 and in FIG. 3 so that fluid communication is enabled between the ports 16 and 20, allowing direct inlet through the device 10. The flow generator of the supply unit 2 intakes filtered air through the port 4 and introduces it into the environment C, thus creating a slight pressurisation thereof. Simultaneously, a certain amount of the air taken in is drawn off and sent into the purge duct P, from which it reaches the valve 14, and from here is sent on to the port (or ports) 18 and towards the filtering device 12, causing purge thereof. The seals S10, S12 prevent intrusion of contaminants, and likewise the slight pressurisation of the volume 30 within the casing 32 (where envisaged) prevents the external air from penetrating into the latter and into the components of the system 1 (this is rendered impossible by the higher pressure present in the volume 30).

An amount of filtered air already introduced into the environment C can be recirculated through the duct 24 to integrate the amount of fresh air that is taken in in the meantime. Preferentially, both the valve 14 and the valve V24 are controlled electrically as a function of pressure signals coming from a first pressure sensor and a second pressure sensor, one set inside the environment (cabin) C, the other set outside the environment C. It should moreover be noted that a temperature sensor may be provided, which, when the supply unit 2 is provided as air-conditioning unit, enables regulation of the temperature—and in general air-conditioning—within the environment C.

In the case of operations in an environment that is not particularly hostile or not contaminated, inlet occurs, instead, through the filtering device 12, in so far as the level of performance of the filtering device 10 is not strictly required.

The valve 14 is switched into the second operating position (visible in FIG. 2 and in FIG. 4), so that fluid communication is enabled between the ports 18 and 20, thus allowing direct inlet through the device 12. The flow generator of the supply unit 2 takes in filtered air through the port 4 and introduces it into the environment C, thus creating a slight pressurisation thereof. Simultaneously, a certain amount of the air taken in is drawn off and sent into the purge duct P, from where it reaches the valve 14, and from here is sent on to the port 16 and towards the filtering device 10, causing purge thereof. This operation is particularly useful after use of the vehicle in a hostile environment in order to free the filter element of the device 10 from the contaminating agents that may have deposited and may not have been withheld by the filter element itself for safety reasons. For this purpose, the filter element of the device 10 is equipped with a filtering layer provided with active carbons for withholding vapours.

As already noted, the seals S10, S12 prevent intrusion of possible residual contaminants, and likewise the slight pressurisation of the volume 30 within the casing 32 (where envisaged) prevents the external air from penetrating therein and into the components of the system 1. Moreover, there is always the possibility of recirculating, through the duct 24, an amount of filtered air already introduced into the environment C to integrate the amount of fresh air that is taken in in the meantime through the filtering device 12.

Figure 5:
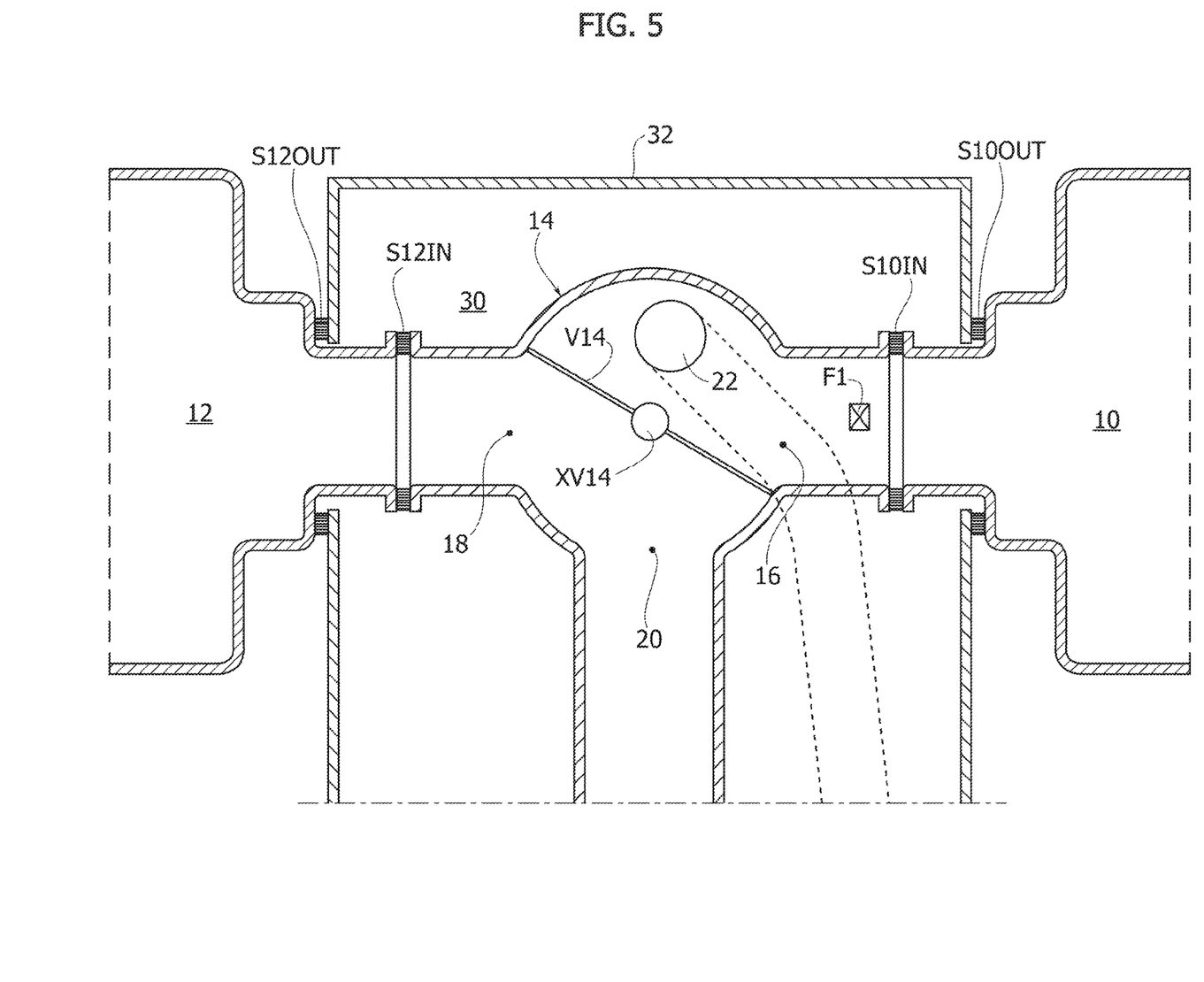
FIG. 5 illustrates a system of seals according to an advantageous aspect of the present invention.

Finally, according to an advantageous aspect of the present invention, it is possible to improve further safety of the system 1 by means of the ensemble of seals illustrated in FIG. 5. Instead of providing a single seal S10 or S12 to ensure tightness between the filtering devices 10, 12 and the casing 32, the seals are provided in dual configuration. On the side of the filtering device 10 and of the port 16 an inner seal S10IN is provided at the interface between the casing of the filtering device 10 and the port 16, and an outer seal S10OUT is provided at the interface between the casing 32 and the casing of the filtering device 10.

On the side of the filtering device 12 and of the port 18, an inner seal S12IN is provided at the interface between the casing of the filtering device 12 and the port 18, and an outer seal S12OUT is provided at the interface between the casing 32 and the casing of the filtering device 12.

The inner seals S10IN, S12IN are immersed in the volume 30, which is pressurised, whereas the outer seals S10OUT, S12OUT are set between the external environment (the pressure of which impinges upon the outer diameter of the seal) and the volume 30 (the pressure of which impinges upon the inner diameter of the seal). In this way, the interface between the filtering device 10, 12 and the valve 14 is entirely within the volume 30, whereas the interface—which is critical—between the volume 30 and the external environment is sealed by the outer seal S10OUT, S12OUT, which, in the case of leakage, does not allow intrusion of contaminants into the volume 30 in so far as the latter is at a pressure higher than the external (environmental) pressure.

It will consequently be appreciated, in the light of the description just provided, how the system 1 affords a high degree of simplicity of construction and low production costs thanks to the provision of a single valve for control of the intake flow (valve 14), and at the same time ensures levels of performance and safety altogether comparable with, or higher than, those of known devices. On the other hand, as should be noted, simplification of the system for controlling the intake flow by providing a single control valve likewise enables limitation of head losses inside the system, to the advantage of energy efficiency thereof.

Of course, the details of construction and the embodiments may vary widely with respect to what has been described and illustrated herein, without thereby departing from the sphere of protection of the present invention, as defined by the annexed claims.

The invention claimed is:

1. An air treatment system (1) for a confined environment (C), comprising:
   a supply unit (2) including an inlet port (4), a delivery port (6) and a purge port (8), said supply unit (2) being configured to deliver air to said confined environment (C) through said delivery port (6),
   a first filtering device (10) having a first level of filtration, and a second filtering device (12) having a second level of filtration, each of said first and second filtering devices (10, 12) being arranged in fluid communication with the inlet port (4) of said supply unit (2) in correspondence of a circuit node (J),
   a flow control valve (14) arranged at said circuit node (J) and including a first working port (16) in fluid communication with said first filtering device (10), a second working port (18) in fluid communication with said second filtering device (12), a third working port (20) in fluid communication with said inlet port (4), and a fourth working port (22) in fluid communication with said purge port (8),
   a recirculation duct in fluid communication with the confined environment (C) and the third working port (20) independent of the circuit node (J) and flow control valve (14),
   the flow control valve (14) further including:
      a first operating position wherein fluid communication is established between the first working port (16) and the third working port (20), and fluid communication is established between the second working port (18) and the fourth working port (22), and
      a second operating position wherein fluid communication is established between the second working port (18) and the third working port (20), and fluid communication is established between the first working port (16) and the fourth working port (22).

2. The system (1) according to claim 1, wherein said supply unit (2) and said flow control valve (14) are housed into an isolated and airtight volume (30).

3. The system (1) according to claim 2, wherein during operation said isolated and airtight volume (30) is configured to be pressurized by an air flow delivered by said supply unit (2).

4. The system (1) according to claim 2, including:
   a first inner seal (S10IN) at an interface between a casing of said first filtering device (10) and said first working port (16),
   a second inner seal (S12IN) at an interface between a casing of said second filtering device (12) and said second working port (18),
   a first outer seal (S10OUT) at an interface between said isolated and air tight volume (30) and the casing of the first filtering device (10),
   a second outer seal (S12OUT) at an interface between said isolated and air tight volume (30) and the casing of the second filtering device (12), said first and second outer seals (S10OUT, S12OUT) being comprised between said isolated and air tight volume (30) and an outer environment.

5. The system (1) according to claim 1, wherein said supply (2) unit includes an air flow generator.

6. The system (1) according to claim 5, wherein said supply unit (2) is an HVAC unit for vehicles.

7. The system (1) according to claim 1, wherein said flow control valve (14) is provided with a mobile assembly comprising a drum (D14) rotatable within a valve body, said drum (D14) including a first mobile septum (D140) and a second mobile septum (D141) shaped so as to define a flow channel with variable cross section, and configured to cooperate with walls of the valve body and with a fixed septum (SP) arranged in correspondence of said third working port (20).

8. The system (1) according to claim 7, wherein said second working port (18) and said fourth working port (22) are twin working ports, and wherein:
   in the first operating position of said flow control valve (14) said flow channel between the first and the second mobile septa (D140, D141) connects the first working port (16) to the third working port (20), while volumes comprised between an exterior of the flow channel and the walls of the valve body each establish fluid communication between pairs of second and fourth twin working ports (18, 22), said flow channel being furthermore divergent towards the third working port (20) so as to open a passageway at sides of the fixed septum (SP), in the second operating position of said flow control valve (14) said flow channel is made blind at said third working port (20) by said fixed septum (SP), in correspondence of said first working port (16) said flow channel encloses the fourth twin working port (22) thereby establishing fluid communication with said first working port (16), while volumes comprised between the exterior of the flow channel and the walls of the valve body on opposite sides of the fixed septum (SP) each establish fluid communication between the second twin working ports (18) and the third working port (20).

9. The system (1) according to claim 1, wherein the first level of filtration is higher than the second level of filtration.

10. The system (1) according to claim 9, wherein the first filtering device complies with the filtering requirements pursuant to UE Category 4 (CAT 4), and the second filtering device complies with the filtering requirements pursuant to UE Category 2 (CAT 2).

11. A vehicle including an air treatment system (1) according to claim 1, the vehicle including a cabin that provides said confined environment (C).

\* \* \* \* \*